US012487441B2

(12) United States Patent
Ferguson (10) Patent No.: US 12,487,441 B2
(45) Date of Patent: Dec. 2, 2025

(54) SYSTEMS AND METHODS FOR FLUORESCENCE MICROSCOPY CHANNEL CROSSTALK MITIGATION

(71) Applicant: ARACELI BIOSCIENCES INC., Tigard, OR (US)

(72) Inventor: Kevin Ferguson, Beaverton, OR (US)

(73) Assignee: ARACELI BIOSCIENCES INC., Tigard, OR (US)

( * ) Notice: Subject to any disclaimer, the term of this patent is extended or adjusted under 35 U.S.C. 154(b) by 406 days.

(21) Appl. No.: 18/330,190

(22) Filed: Jun. 6, 2023

(65) Prior Publication Data

US 2024/0329382 A1  Oct. 3, 2024

Related U.S. Application Data

(63) Continuation-in-part of application No. 18/194,449, filed on Mar. 31, 2023.

(51) Int. Cl.
G02B 21/36 (2006.01)
G01N 21/64 (2006.01)

(52) U.S. Cl.
CPC ....... G02B 21/367 (2013.01); G01N 21/6458 (2013.01); *G06T 2207/10056* (2013.01); *G06T 2207/10064* (2013.01)

(58) Field of Classification Search
CPC .............. G02B 21/367; G01N 21/6458; G06T 2207/10056; G06T 2207/10064; G06T 5/73

See application file for complete search history.

(56) References Cited

U.S. PATENT DOCUMENTS

2004/0161165 A1  8/2004  Riley et al.
2005/0264813 A1  12/2005  Gaikos
2006/0146149 A1*  7/2006  Palum ............... H04N 25/134
                                                                348/E9.01

(Continued)

FOREIGN PATENT DOCUMENTS

WO        2007002367 A2    1/2007

OTHER PUBLICATIONS

ISA Korean Intellectual Property Office, International Search Report and Written Opinion Issued in Application No. PCT/US2024/032648, Oct. 2, 2024, WIPO, 10 pages.

*Primary Examiner* — Jennifer D Bennett
(74) *Attorney, Agent, or Firm* — McCoy Russell LLP (57) ABSTRACT

Methods and system are provided herein for crosstalk mitigation, such as the removal of crosstalk interference from a microscopy image signal to recover an intended image from the image signal. In one example, a method includes accumulating a plurality of weighting constant values and variance data to determine a weighting constant of a weighted interference signal of a microscopy image, wherein determining the weighting constant comprises fitting the plurality of weighting constant values and variance data to a quadratic curve; determining the weighted interference signal of the microscopy image based on the weight constant; removing the weighted interference signal from an overall image signal of the microscopy image; and determining a recovered image signal based on removal of the weighted interference signal from the overall image signal.

20 Claims, 7 Drawing Sheets

(56) References Cited

U.S. PATENT DOCUMENTS

| | | | |
|---|---|---|---|
| 2012/0015825 A1* | 1/2012 | Zhong | G01N 21/6428 506/13 |
| 2020/0249163 A1* | 8/2020 | Bierdz | G01N 21/6428 |
| 2020/0333249 A1 | 10/2020 | Wang et al. | |
| 2020/0388033 A1 | 12/2020 | Matlock et al. | |
| 2021/0192786 A1 | 6/2021 | Ozaki | |

* cited by examiner

SYSTEMS AND METHODS FOR FLUORESCENCE MICROSCOPY CHANNEL CROSSTALK MITIGATION

CROSS REFERENCE TO RELATED APPLICATIONS

The Present application is a continuation-in-part of U.S. Non-Provisional patent application Ser. No. 18/194,449, entitled "SYSTEMS AND METHODS FOR FLUORESCENCE MICROSCOPY CHANNEL CROSSTALK MITIGATION", and filed on Mar. 31, 2023. The entire contents of the above-listed application are hereby incorporated by reference for all purposes.

FIELD

Embodiments of the subject matter disclosed herein relate generally to fluorescence microscopy, and more particularly to channel crosstalk mitigation in fluorescence microscopy.

BACKGROUND/SUMMARY

Various imaging technologies, such as microscopy techniques, may be used to acquire digital images of cells, biological structures, or other materials. Fluorescent dyes in a sample emit light at a lower wavelength than the light used to illuminate them. Dichroic filters are included in such microscopes to block illumination light and pass emission light. Microscopy techniques for illuminating and imaging fluorescent dyes and concurrently imaging structures are routinely used for studying complex biological structures, cells, and others. Due to a number of factors including potential chemical interactions between dyes and a sample, wavelengths of absorption or illumination and corresponding emission, and dye availability, bioassays may not be simply adjusted to accommodate a particular dichroic filter design. As a result, less than ideal matching of illumination and emission wavelengths may result in the emission spectrum of a particular fluorescent dye straddling two different emission channels.

A fluorescent dye straddling two different emission channels may result in interference if one of the channels was intended for a different fluorescent dye. This interference or signal degradation is generally referred to as channel-to-channel crosstalk. Channel-to-channel crosstalk may decrease accuracy of an image for a particular channel of an image or signal and as such may decrease usability of the information acquired from the image or signal.

Current approaches for crosstalk mitigation include image subtraction by way of a binary classification of pixels accomplished by examining and comparing pixels to determine to which channel a particular pixel belongs or calculating the expected crosstalk using all known parameters. In the former approach, while crosstalk may be determined, removal of interference is not accomplished. In the latter approach, knowledge of spectra including characterization of illumination lights, dyes, and any shifts due to chemistry, for example measured by a spectrometer or otherwise known, are demanded in order to properly calculate the expected crosstalk. If any of the parameters are unknown, the process becomes impractical.

The inventors herein have recognized the above-mentioned issues and have engineered a way to at least partially address them. In one example, a method may include determining a weighted interference signal of a microscopy image, removing the weighted interference signal from an overall signal of the microscopy image, and determining an intended image signal from the overall signal. The intended image signal is an image signal for a first channel of a microscopy system. The weighted interference signal may be a product of an unweighted interference signal from a second channel of the microscopy system and a weighting constant (e.g., a scalar constant). The weighting constant may be determined to provide a minimum variance for the recovered image signal. An approximation of gradient descent may provide the weighting constant that provides minimum variance of the recovered (e.g., intended) image signal by iteratively trying weighting constants and determining variance for each weighting constant. In some examples, a quadratic function may be fit to the accumulated weighting constant values and variance data from the approximation of gradient descent and from there, a weighting constant value that provides minimum variance may be directly determined by finding a minimum of the quadratic function. The overall signal may be known and/or determined by a computing system of the microscopy system and the unweighted interference signal may be known and/or determined by the computing system.

In this way, by determining the weighting constant that provides the minimum variance for the recovered image signal, the intended image signal may be recovered from the overall image signal. The methods described herein are executable by a processor of the computing system without knowledge of microscopy system specifics such as dye spectra, light source specifics (e.g., illumination magnitude, etc.), and shifts in spectra due to chemistry, among others, or demanding use of a spectrometer to measure the spectra.

The above advantages and other advantages, and features of the present description will be readily apparent from the following detailed description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
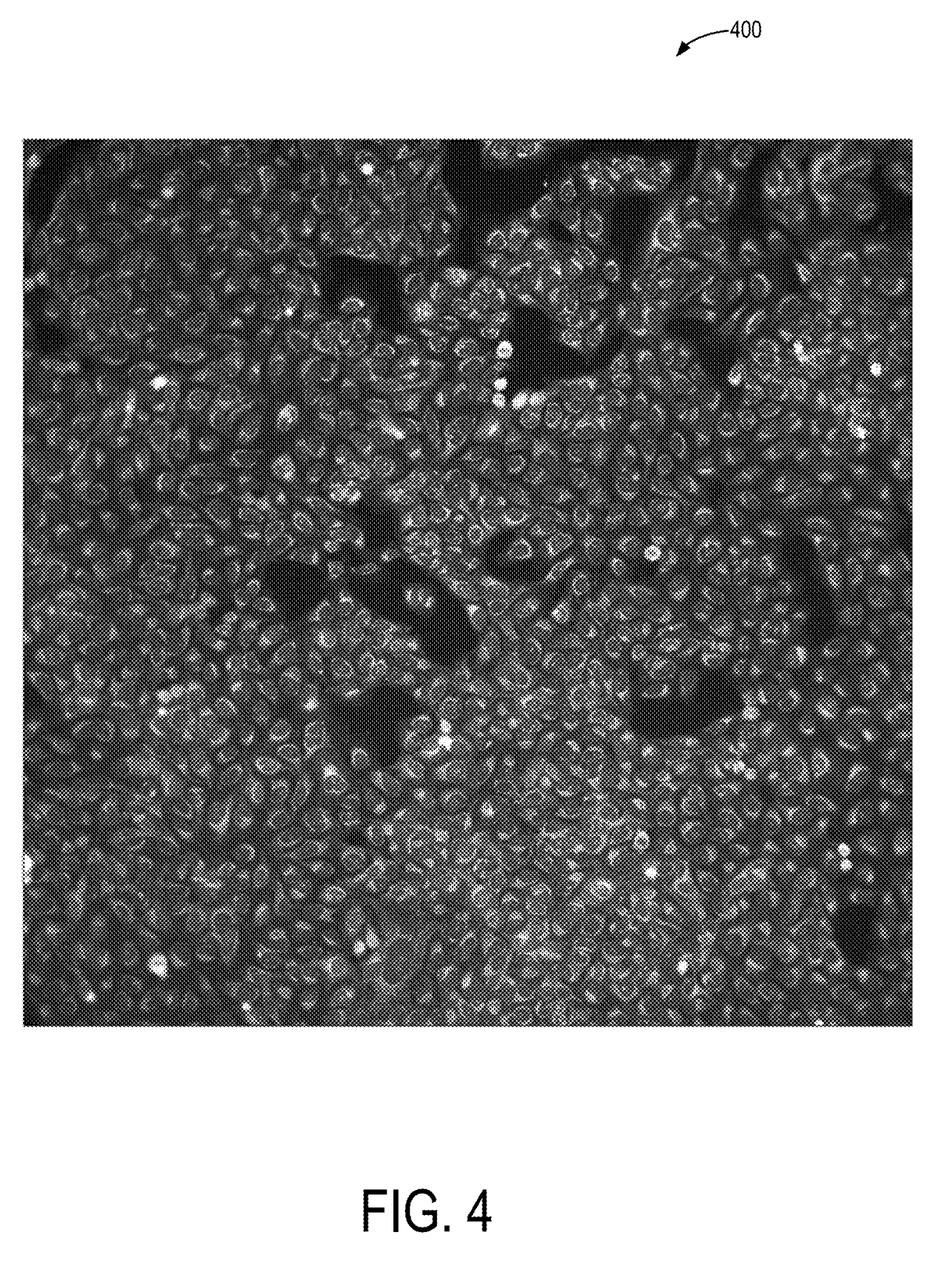
FIG. 4 shows an example of an image with crosstalk interference.
Figure 5:
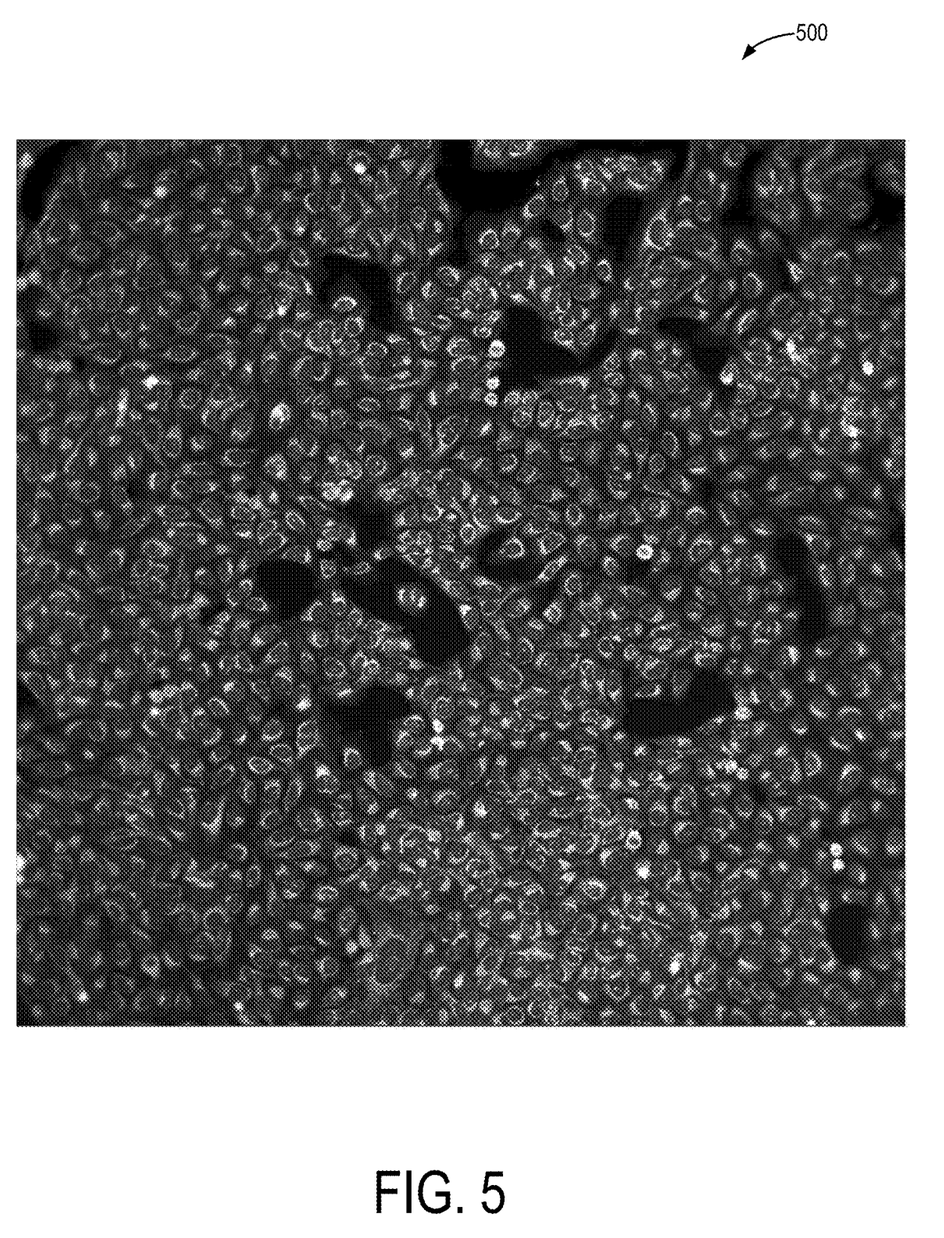
FIG. 5 shows an interfering image of the image of FIG. 4.
Figure 6:
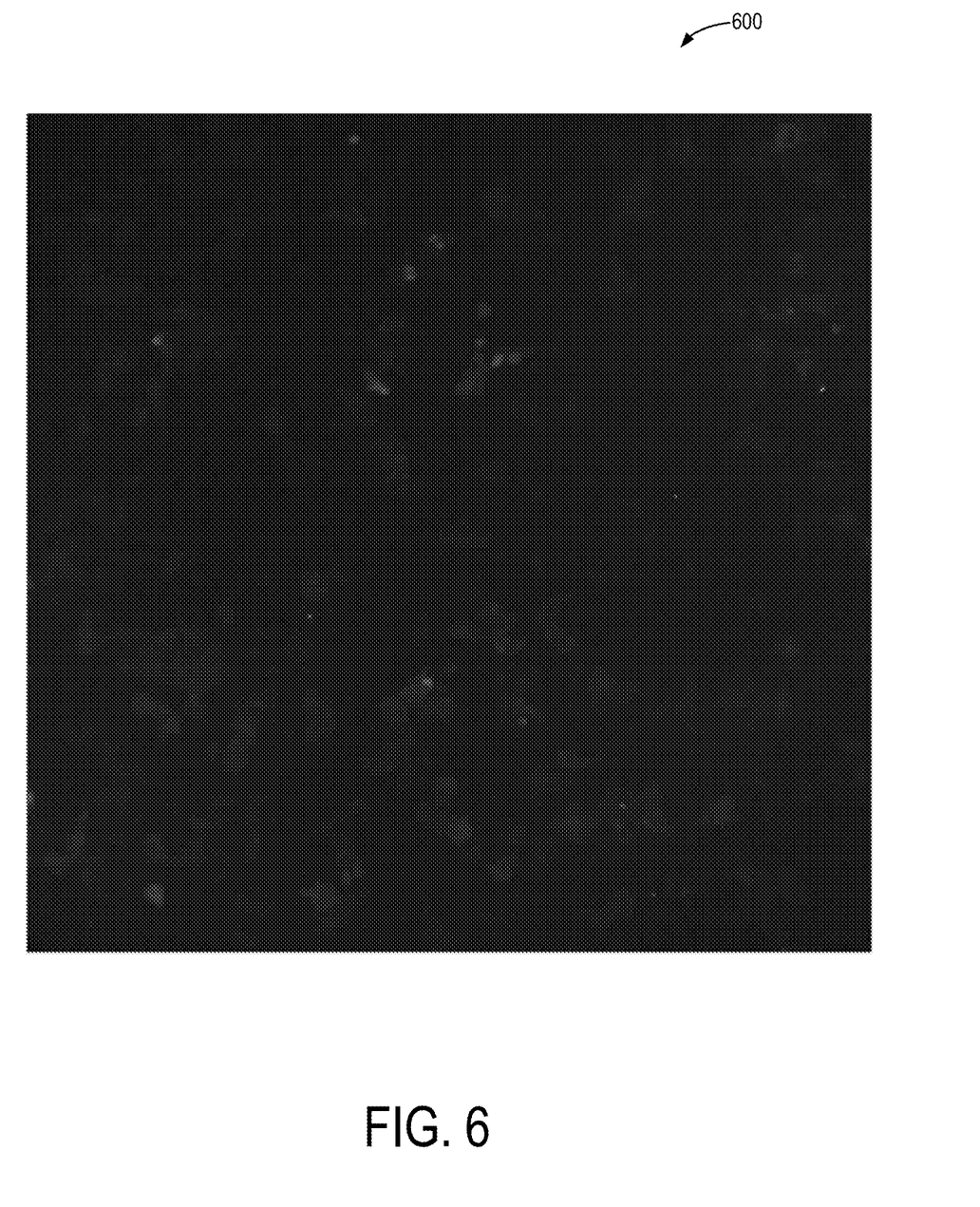
FIG. 6 shows an example of a restored image.

The present description is related to image quality of images obtained via fluorescence microscopy assemblies. Images obtained via fluorescence microscopy are subject to crosstalk interference, whereby a signal from a first channel is degraded by an interfering signal from a second channel due to a fluorescent dye straddling the first and second channels. A method for crosstalk mitigation is herein described, wherein a weighted interference signal is removed from an image signal with crosstalk interference to restore an image of the first channel. Crosstalk mitigation may be employed by a controller (e.g., a computing system) in communication with a fluorescence microscopy system, such as microscopy system 100 shown in FIG. 1. The controller may employ one or more methods, such as the methods shown in FIGS. 2, 3, and 7, to remove crosstalk interference from an image and restore the image signal of the first channel. FIG. 4 shows an example of an image with crosstalk interference. FIG. 5 shows an example of an interfering image and FIG. 6 shows an example of a restored image.

Figure 1:
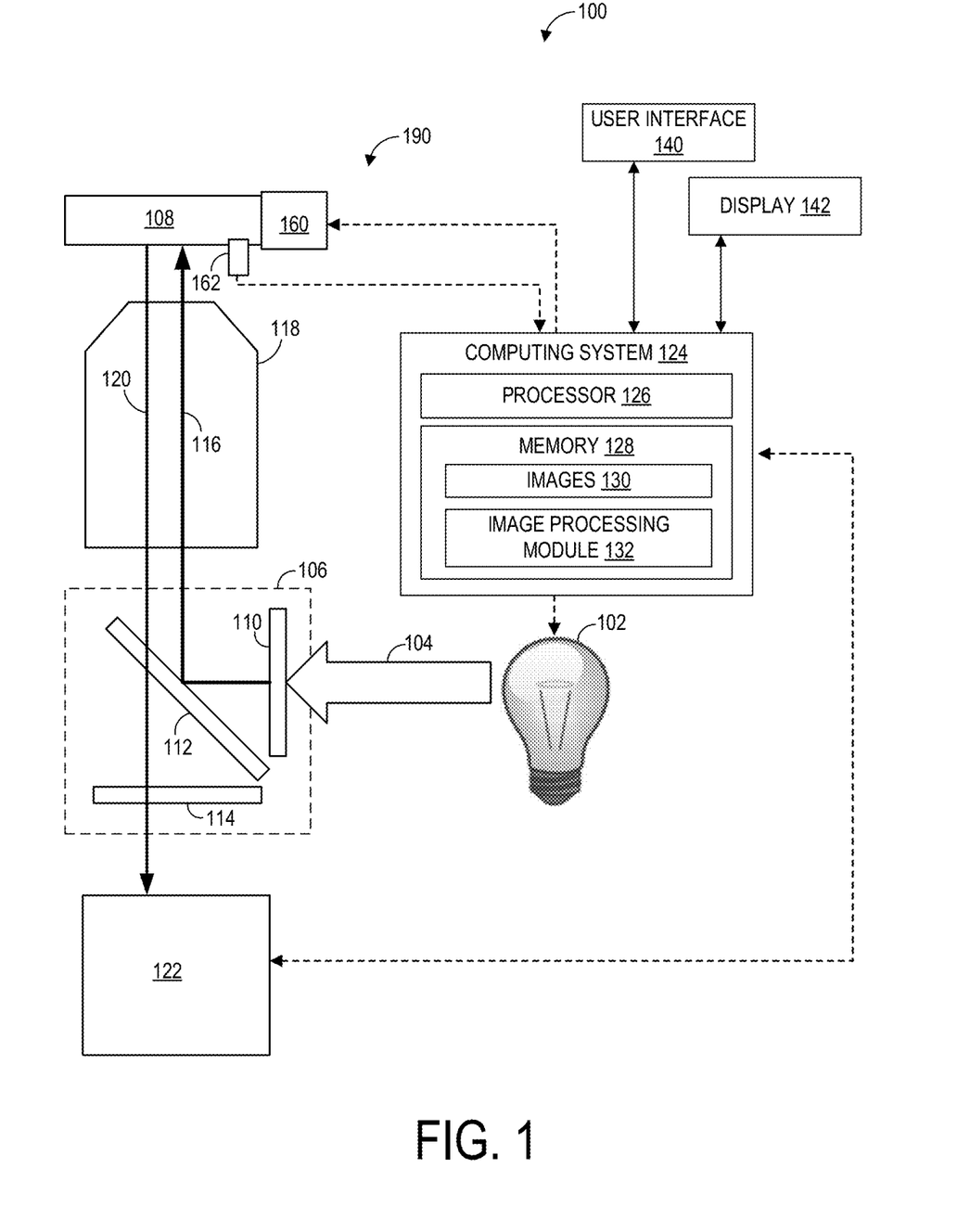
FIG. 1 shows a diagram of a microscopy system.

Turning now to FIG. 1, a schematic diagram for a microscopy system 100 (hereafter, the system 100) is shown. In one example, the system 100 may be configured as a fluorescence microscopy system. An imager 190 of the system 100 may include a light source 102 providing incident light to components arranged in a path of the incident light, as indicated by arrow 104. The light source 102 may be a mercury-vapor lamp, a xenon arc lamp, a laser, or one or more light-emitting diodes (LEDs). In some examples, the system 100 may be included in a multi-detector microscope system.

The incident light may be directed to a filter cube 106 (e.g., also called a filter block). The filter cube 106 may house components that filter the incident light such that target wavelengths are transmitted to a target to be analyzed, e.g., one or more samples supported on a sample holder 108. In one example, the sample holder 108 may be a microplate. In the example of FIG. 1, three filtering components are arranged in the filter cube 106, including an excitation filter 110, a dichroic filter 112, and an emission filter 114. The incident light may first pass through the excitation filter 110 which filters the light to allow select, e.g., target, wavelengths to continue past the excitation filter 110 and block other wavelengths of light. The target wavelengths may be wavelengths that excite electrons in specific fluorophores or fluorochromes, resulting in release of photons when the excited electrons relax to a ground state.

The excitation light, e.g., light that has been filtered by the excitation filter 110, then strikes the dichroic filter 112 (or dichroic beamsplitter), as indicated by arrow 116. The dichroic filter 112 may be a mirror, for example, arranged at a 45 degree angle relative to an optical path of the system 100, e.g., angled at 45 degrees relative to the path of incident light indicated by arrow 104. A surface of the dichroic filter 112 may include a coating that reflects the excitation light, e.g., light filtered by the excitation filter 110, but allows fluorescence emitted from the sample at the sample holder 108 to pass therethrough. The reflected excitation light, as indicated by arrow 116, passes through an objective lens 118 to illuminate the sample holder 108. If the sample positioned in the sample holder 108 fluoresces, light is emitted, e.g., generating emission light as indicated by arrow 120, and collected by the objective lens 118. The emission light passes through the dichroic filter 112 and continues to the emission filter 114, which blocks undesired excitation wavelengths from passing therethrough. The filtered emission light is received at a detector 122. The detector 122 may be a camera, such as a charge-coupled device (CCD) camera, in one example. In other examples, the detector 122 may be another type of camera, for example, a CMOS camera, or a photomultiplier tube.

At the detector 122, the emission light may be converted into electronic data. For example, when the detector 122 is the CMOS camera, the detector 122 may include a light sensor configured as a transistor on an integrated circuit. Photons of the emission light may be incident on the light sensor and generate an electrical charge that is converted into electronic data representative of a photon pattern of the emission light captured within a field of view (FOV) of the camera. The electronic data may be stored at a memory of the camera, such as random access memory, and may be retrieved by a computing system 124.

The computing system 124 may be a computing device or other computer. The computing system 124 may include a processor 126 and a memory 128. The processor 126 may comprise one or more computational components usable for executing machine-readable instructions. For example, the processor 126 may comprise a central processing unit (CPU) or may include, for example a graphics processing unit (GPU). The processor 126 may be positioned within the computing system 124 or may be communicatively coupled to the computing system 124 via a suitable remote connection.

The memory 128 may comprise one or more types of computer-readable media, including volatile and/or non-volatile memory. The volatile memory may comprise, for example, random-access memory (RAM), and the non-volatile memory may comprise read-only memory (ROM). The memory 128 may include one or more hard disk drive(s) (HDDs), solid state drives (SSDs), flash memory, and the like. The memory 128 is usable to store machine-readable instructions, which may be executed by the processor 126. The memory 128 is further configured to store images 130, which may comprise digital images captured or created using a variety of techniques, including digital imaging, digital illustration, and more. The images 130 may further include one or more reference images and/or one or more acquired images.

At least a portion of the images 130 may be acquired via the system 100. The memory 128 further includes an image processing module 132, which comprises machine-readable instructions that may be executed by the processor 126 to remove crosstalk interference from the images 130. The image processing module 132 thus contains machine-readable instructions for manipulation of digital images (e.g., the images 130), such as instructions to perform crosstalk mitigation methods. For example, the machine-readable instructions stored in the image processing module 132 may correspond to one or more methods, examples of which are provided with respect to FIGS. 2-3.

The system 100 further include a user interface 140, which may comprise one or more peripherals and/or input devices, including, but not limited to, a keyboard, a mouse, a touchpad, or virtually any other input device technology that is communicatively coupled to the computing system 124. The user interface 140 may enable a user interact with the computing system 124, such as to select one or more images to evaluate, to select one or more parameters of the imager 190, and so forth.

The system 100 further includes a display device 142, which may be configured to display results of crosstalk removal, display the images themselves, and display possible parameter options and selections related to the acquisition of images, including one or more dye wavelengths, channels, and emission spectra, for example. The user may select or otherwise input parameters via the user interface 140 based on options displayed via the display device 142.

The computing system 124 may be communicatively coupled to components of the system 100. For example, the computing system 124 may be configured to command activation/deactivation of the light source 102 when prompted based on user input. As another example, the computing system 124 may instruct adjustment of a position of the sample holder 108 to focus the excitation light on a different region of the sample holder. The computing system 124 may command actuation of a motor 160 coupled to the sample holder 108 to vary the position of the sample holder 108 with respect to the objective lens 118 and the excitation light and provide instructions on how the sample holder position is to be modified. In some examples, a position sensor 162 may monitor the actual position of the sample holder 108 and may be communicatively coupled to the computing system 124 to relay the sample holder position to the computing system 124.

The computing system 124 may also be communicatively coupled to the detector 122. As such, electronic data collected by the detector 122 may be retrieved by the computing system 124 for further processing and display at an interface, such as a computer monitor. It will be appreciated that the computing system 124 may be further coupled to other sensors and actuators of the system 100. In one example, communication between the computing system 124 and the sensors and actuators of the system 100 may be enabled by various electronic cables, e.g., hardwiring. In other examples, the computing system 124 may communicate with the sensors and actuators via a wireless protocol, such as Wi-Fi, Bluetooth, Long Term Evolution (LTE), etc.

It will be appreciated that the system 100 depicted in FIG. 1 is a non-limiting example of a fluorescence microscopy system. Other examples may include variations in quantities of individual components, such as a number of dichroic, excitation, and emission filters, a configuration of the light source, relative positioning of the components, etc. In one example, the fluorescence microscopy system, e.g., the system 100 of FIG. 1, may be used for high through-put screening of biological samples.

Figure 2:
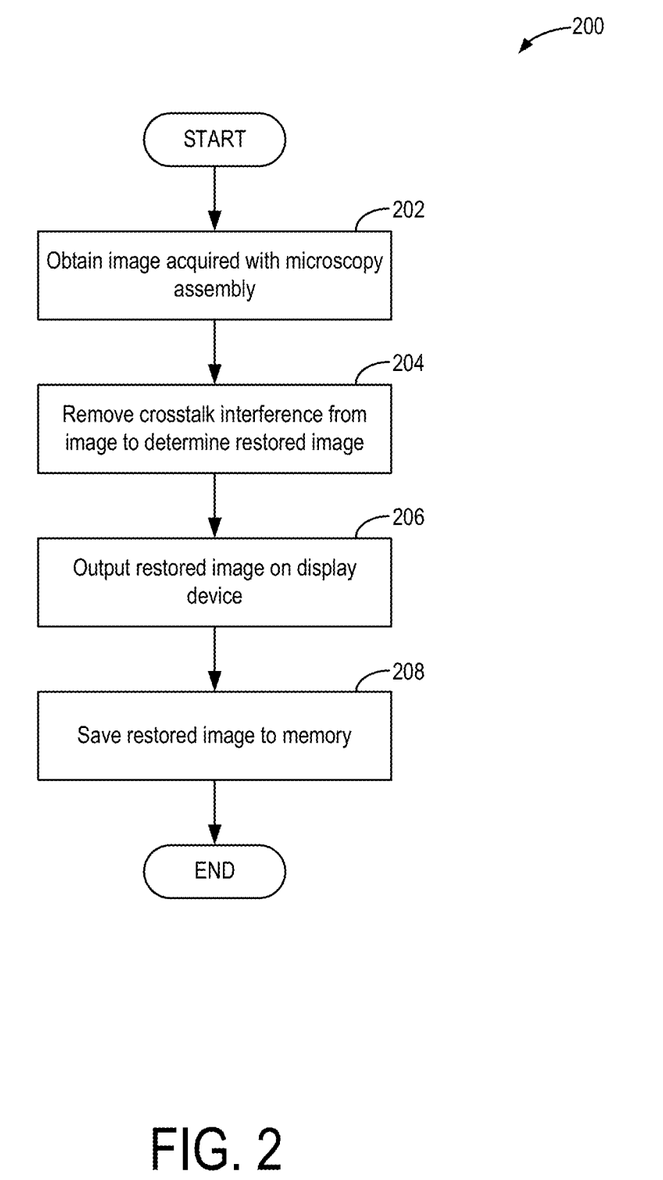
FIG. 2 shows a high-level flowchart illustrating an example method for restoring an image of a first channel.

Referring now to FIG. 2, a high-level flowchart illustrating an example method 200 for restoring an image of a first channel is shown. The method 200, and other methods included herein, may be executed by a processor of a computing system, such as the processor 126 of the computing system 124 of FIG. 1, according to instructions stored in non-transitory memory of the computing system (e.g., within the image processing module 132 of the memory 128 of FIG. 1).

At 202, the method 200 includes obtaining an image acquired with a microscopy system. The microscopy system may be the system 100 of FIG. 1 and may be configured as a fluorescence microscopy system. The image acquired by the microscopy system may be an original image that includes multiple channel signals. For example, a first channel may have a first signal and a second channel may have a second signal. The second signal may be an interference signal. Both the first and second signals may be included in the image and as a result, the image may be an image with crosstalk interference. In some examples, the image may be obtained from memory of the computing system. In other examples, the image may be obtained from external memory (e.g., an external drive such as a flash drive, optical storage device, or the like).

At 204, the method 200 includes removing crosstalk interference from the image to determine a restored image. Removing the crosstalk interference may include determining a weighted interference signal that minimizes variance, as will be described in greater detail with respect to FIG. 3. The weighted interference signal may be the second signal weighted by a constant. The weighted interference signal may be used to determine the first signal, the first signal being the signal of the restored image. The computing system herein described may include executable instructions to generate and/or construct the restored image from the first signal.

At 206, method 200 includes outputting the restored image on a display device. The display device may be the display device 142 of FIG. 1. The display device may be in communication with the computing device so as to display images generated by the computing device. The display device may display the restored image for viewing by a user. In this way, the user may be able to visualize the first signal from the first channel without the second, interfering signal as was included in the original image.

At 208, method 200 includes saving the restored image to memory. The memory may be memory 128 of the computing system 124 of FIG. 1. Saving the restored image may allow for the restored image to be used for downstream applications. For example, if more than two adjacent channels have crosstalk, the method may be repeated. As an example, the second channel may be crosstalking into the first channel, as is described above, and the first channel may be crosstalking into a third channel. In such an example, the interference from the second channel into the first channel may be removed as described above, restoring the first image of the first channel. The restored first image of the first channel may be removed from the third channel in a similar fashion.

In any iteration, an adjacent channel that is interfering (e.g., the second channel described above) but does not itself include crosstalk interference may be removed from a channel to which it is adjacent (e.g., the first channel described above). Restoration of an image (e.g., the first image) allows for that image to be removed from another adjacent image into which it is interfering. In this way, the method allows for restoration of multiple images from multiple channels.

Figure 3:
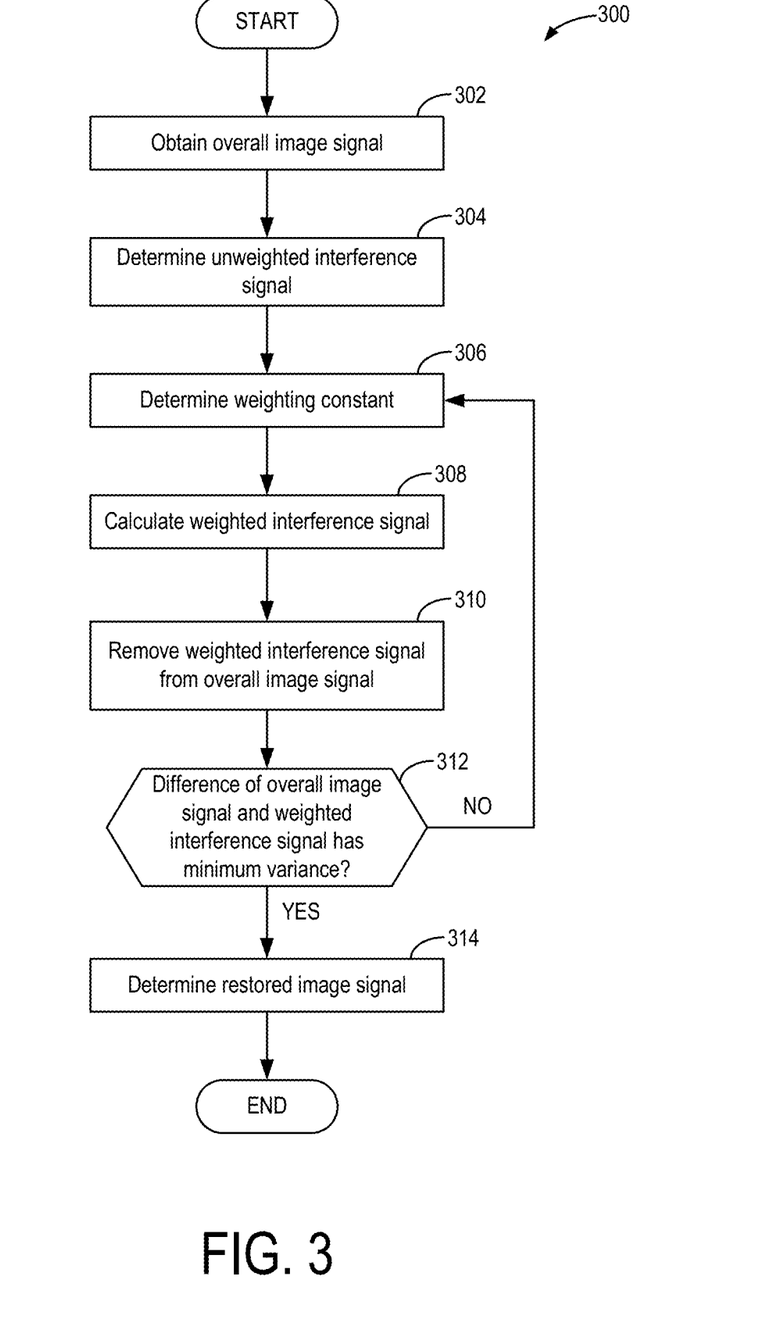
FIG. 3 shows a flowchart illustrating an example method for determining a restored image signal from an image signal with crosstalk interference.

Referring now to FIG. 3, a flowchart illustrating an example method 300 for determining a restored image signal from an image signal with crosstalk interference is shown. As noted above, the method 300 may be executed by a processor of a computing system according to instructions stored in a non-transitory memory. In some examples, the method 300 may be performed as a part of the method 200 of FIG. 2 (e.g., at 204).

At 302, method 300 includes obtaining an overall image signal. The overall image signal may be an image signal with crosstalk interference, for example the overall image may include a first channel signal and a weighted second channel signal (e.g., the overall image signal may be a sum of the first channel signal and the weighted second channel signal). The overall image signal may be known and/or determined by the computing system following acquisition of the overall image by a microscopy system (e.g., the system 100 of FIG. 1). The overall image signal may be what is outputted for the first channel, and the second channel signal may be interfering due to crosstalk, thereby creating the image signal with crosstalk interference. The overall image signal may be a real or complex number. The overall image signal value is given by equation (1):

$$I = s_1 + s_2 c \quad (1)$$

where I is the overall image signal value, $s_1$ is a first channel signal value, $s_2$ is a second channel signal value, and c is a scalar constant (e.g., a weighting constant). The product of the second channel signal value and the scalar constant may be a weighted interference signal.

At 304, method 300 includes determining an unweighted interference signal. As described, the overall image signal value may be known based on image acquisition. The second channel signal value may also be known in a similar way, as the second channel signal may not include interference from an adjacent channel. The second channel signal value may be the unweighted interference signal. Determining the unweighted interference signal may therefore include obtaining the second channel signal.

At 306, method 300 includes determining a weighting constant. The weighted interference signal may be a product of the unweighted interference signal (e.g., the second channel signal value) and the scalar constant c (e.g., the weighting constant). In order to determine the weighted interference signal, the scalar constant c may be determined that provides a minimum variance. In order to determine variance when the first signal and the second signal are approximately uncorrelated, equation (1) may be squared to provide equation (2):

$$I^2 = s_1^2 + s_2^2 c^2 \quad (2)$$

where each of the variables are as described with reference to equation (1). When the first signal and the second signal are approximately uncorrelated, a product $2*s_1*s_2*c$ may be approximately equal to zero such that a squaring of equation (1) results in equation (2).

Determination of the scalar constant c that provides minimum variance is described by equations (3) and/or (4):

$$\min_c [(I - s_2 c)^2] \quad (3)$$

$$\min_c \left( \sum (I_{(x,y)} - s_{2(x,y)} c)^2 \right) \quad (4)$$

where (x, y) specifies a coordinate for the overall image signal and the second image signal.

At 308, method 300 includes calculating the weighted interference signal based on a determined weighting constant. The value of the scalar constant c that provides the minimum variance may be determined by an approximation of a gradient descent algorithm, whereby changes in variance are monitored with respect to changes in the scalar constant in a step wise fashion such that the resulting variances continue to decrease. Determination of the scalar constant c in such a manner is provided by equation (5):

$$\min_c \left[ \sum (I - s_2 c)^2 \right] \quad (5)$$

where equation (5) is the same as equation (4), but does not include coordinate positions.

Alternative to determining minimum variance, in some examples, minimum energy of the recovered image signal may be determined. Similar to as described with reference to equation (2), with respect to equations (4) and (5), when the first signal and the second signal are approximately uncorrelated, the product $2*s_1*s_2*C$ or a product $2*s_1*s_2*c_2$ (both as derived when factoring the square) are approximately equal to zero. In this way, equation (1) may be taken with either equation (5) or equation (4) to determine minimum energy or variance, respectively, over c to provide equations (6) and (7):

$$\min_c \sum (s_1^2 + s_2^2 (c - c_0)^2) \quad (6)$$

$$\min_c \sum (s_{\sigma_{1(x,y)}}^2 + s_{\sigma_{2(x,y)}}^2 (c - c_0)^2) \quad (7)$$

where each of the variables are as described above, and co is a portion of the interfering signal that has been added to the signal of interest (e.g., the intended signal), wherein scalar constant c is adjustable to find the minimum variance of the recovered signal. When c and co are equal, the first signal (e.g., the recovered signal) has minimum energy or variance. Derivation with respect to minimum energy may provide equation (6) and derivation with respect to minimum variance may provide equation (7).

At 310, method 300 includes removing the weighted interference signal determined at 308 from the overall image signal. Using equation (1), the first image signal may be solved for by removing (e.g., subtracting) the weighted interference signal (e.g., the product of the second image signal and the scalar constant) from the overall image signal.

At 312, the method 300 determines if the difference of the overall image signal and the weighted interference signal has minimum variance. The difference of the overall image signal and the weighted interference signal may be the recovered image signal. The approximation of a gradient descent may allow for determining a value of the scalar constant, and consequently the weighted interference signal, that does not remove too much signal from the overall image signal. For example, a too large value of the scalar constant may result in the recovered image signal being negative, while a too small value of the scalar constant may result in not removing enough signal from the overall image signal resulting in a recovered image that still has crosstalk interference. The minimum variance may minimize these too small and too large values, aiming to determine a value for the scalar constant that removes enough interfering signal from the overall image signal to adequately recover the intended image signal. If the recovered image signal has minimum variance (YES), method 300 proceeds to 314. If the recovered image signal does not have minimum variance, for example if the weighting constant is too large or too small, as described above, method 300 returns to 306 to determine the weighting constant that provides minimum variance. This process of returning to 306 following 308 and 310 may describe the approximation of gradient descent described above, whereby values are tried sequentially until a value that provides minimum variance is reached, at which point the method 300 may proceed to 314. In the approximation of gradient descent, a subsequent value of the scalar constant may be a sum of the previous value of the scalar constant and a delta value that represents the amount of change between the values. The approximation of gradient descent, by nature of including a plurality of iterations as described above, accumulates a value of the scalar constant and variance data for each iteration. In some examples, a number of iterations completed may be predefined, whereby at 312, the method 300 may return to 306 a maximum of a preset number of times and the value of the scalar constant (e.g., the weighting constant) that provides a minimum variance among the iterations completed may be used as the weighting constant.

At 314, method 300 includes determining a restored (e.g., recovered) image signal. The restored image signal may be the first image signal $s_1$ that is included within the overall image signal that includes crosstalk interference. Removing the weighted interference signal determines a difference between the overall image signal and the weighted interference signal. The difference may be the restored image signal. The restored image signal may be an intended signal from the first channel without crosstalk. The restored image signal, as described with reference to method 200 of FIG. 2, may then be displayed or otherwise outputted on a display device.

In this way, by determining the weighted interference signal, by way of determining a weighting constant that provides minimum variance, the first image signal may be recovered from the overall image signal that includes crosstalk interference. The methods herein described are able to be performed without needing to know spectra of fluorescent dyes used, specifics of the light source (e.g., an LED) used during imaging, or any other optical specifications of the microscopy system.

Additionally, the methods herein described may be applied to scenarios with various amounts of interference, from mild to severe. For example, interferences with resulting signal to noise ratios in the range of −20 Db may be considered severe. The methods discussed herein may recover image signals in cases where interference results in signal to noise ratios in the range of −20 Db.

As mentioned above, in some examples the overall image signal may be a first image signal that includes a second image signal of a first channel interfering into a third image signal of a second channel causing a first crosstalk interference. The third image signal may further interfere into a fourth image signal of a third channel causing a second crosstalk interference. A fifth image signal may include the third image signal and the fourth image signal. Following the method 300 described above, the third image signal may be recovered from the first image signal by removal of a first weighted interference of the second image signal. Then, using the recovered third image signal, the fourth image signal may be recovered from the fifth image signal by removal of a second weighted interference of the third image signal. In this way, the method 300 may be applied with multiple channels of crosstalk interference as long as at least one of the channel signals is not interfered by an adjacent channel. As such, each channel of multiple channels may be recovered and separated from adjacent channels without knowledge of imaging specifics (e.g., dye spectra, LED specifications, etc.).

Turning now to FIGS. 4-6, example images are shown. A first image 400 is depicted in FIG. 4, a second image 500 is depicted in FIG. 5, and a third image 600 is depicted in FIG. 6. The first image 400 of FIG. 4 may be an example of an overall image (e.g., a microscopy image) that includes channel-to-channel crosstalk interference. The second image 500 of FIG. 5 may be an example of an image of an unweighted interference signal (e.g., an interfering image). The third image 600 of FIG. 6 may be an example of a recovered image outputted following removal of crosstalk interference.

As described above, a sample imaged by a microscopy assembly (e.g., the imager 190 of the system 100 of FIG. 1) may include a fluorescent dye that emits a spectrum of wavelengths. The spectrum of wavelengths may straddle or be included in two or more channels. One of the two or more channels may be the intended channel for the fluorescent dye, while other channels of the two of more channels may be intended for other fluorescent dyes. Because the fluorescent dye emits wavelengths that are included in two or more channels however, interference occurs with a signal of another dye.

As an example, the first image 400 may be the microscopy image resultant from the spectrum of wavelengths included in two or more channels. As a result, the first image 400 may include crosstalk interference. The third image 600 may be from a first channel intended for the fluorescent dye, such as a red channel. The second image 500 may be from a second channel intended for another fluorescent dye, such as a far red channel. A signal of the second image 500 may be interfering into a signal of the third image 600, resulting in the first image 400 that includes interference due to crosstalk from the far red channel into the red channel.

The third image 600 may be recovered from the first image 400 by way of the methods provided above. A weighted interference signal of the second image 500 may be determined based on a calculated weighting constant (e.g., the scalar constant c described with reference to FIG. 3) and the signal of the second image 500. The weighted interference signal may be a measure of how much interference the signal of the second image 500 is causing the third image 600 to result in the first image 400.

Figure 7:
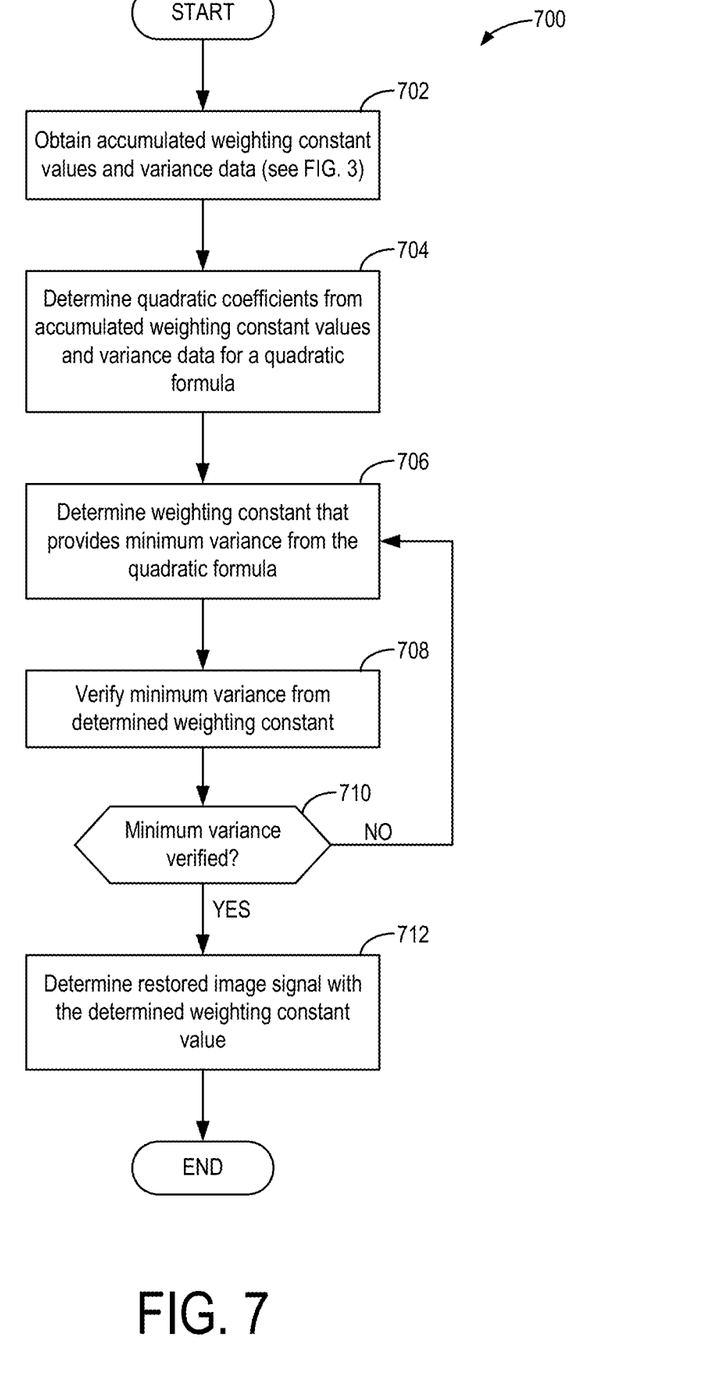
FIG. 7 shows a flowchart illustrating an example method for determining a weighting constant.

Turning now to FIG. 7, a flowchart illustrating a method 700 for determining the weighting constant is shown. Similar to as noted above, the method 700 may be executed by a processor of a computing system according to instructions stored in a non-transitory memory. In some examples, the method 700 may be performed as a part of the method 200 of FIG. 2 (e.g., at 204) and in addition to method 300 when removing crosstalk interference from an image signal.

At 702, method 700 includes obtaining accumulated weighting constant values and variance data. As described with reference to FIG. 3, the approximation of gradient descent, which includes sequentially trying weighting constant values to reach a value that provides minimum variance, generates a weighting constant value and variance data for each iteration. Thus, the approximation of gradient descent accumulates a plurality of weighting constant values and variance data, one of each for each of the iterations.

At 704, method 700 includes determining quadratic coefficients from the accumulated weighting constant values and variance data for a quadratic formula. A quadratic function/curve may be fit to the accumulated weighting constant values and variance data to provide equation (8):

$$y(x) = ax^2 + bx + c \qquad (8)$$

where c, b, and a are coefficients determined from the accumulated weighting constant values and variance data. In some examples, fitting the accumulated weighting constant values and variance data to the quadratic function to determine coefficients c, b, and a includes performing a regression algorithm, such as a least square error algorithm. At 706, method 700 includes determining a weighting constant that provides minimum variance from the quadratic formula. Determining the weighting constant that provides minimum variance may, in some examples, comprise finding a minimum of the quadratic function. The minimum value of the quadratic curve may occur when a derivative of the quadratic function is equal to zero. The derivative of equation (8) is provided in equation (9), which, when set to zero, may also be written as equation (10):

$$\frac{dy}{dx} = 2ax + b \quad (9)$$

$$x = \frac{-b}{2a} \quad (10)$$

where the variables are as explained with respect to equation (8). As noted, the minimum variance occurs when equation (9) is equal to zero. In order to determine the weighting constant that provides minimum variance, equation (10) may be solved directly for x. The determined x value may be the weighting constant c of equation (1) that provides minimum variance for the recovered image signal.

At 708, method 700 includes verifying the minimum variance from the weighting constant determined at 706. Verification of that the determined weighting constant provides minimum variance may include determining the variance of the restored image signal with the determined weighting constant, for example via equation (4) described with reference to FIG. 3. This determined variance based on the determined weighting constant may be compared to other calculated variance data from the weighting constant values and variance data accumulated via the approximation of gradient descent. The comparison may confirm whether the weighting constant determined at 706 is minimum or not. In some examples, further iterations of the approximation of gradient descent may be performed to increase amount of accumulated weighting constant values and variance data, as will be described below.

At 710, method 700 includes judging whether minimum variance is verified at 708. If minimum variance is not verified and the weighting constant determined at 706 is determined to not provide minimum variance such as to remove either too much or too little from an overall image signal when determining the recovered image signal, method 700 returns to 702. As noted above, at 702, accumulated weighting constant values and variance data is obtained. Returning to 702 if minimum variance is not reached may comprise performing additional iterations of the approximation of gradient descent to provide additional weighting constant values and variance data that may be fit to a quadratic function (which may be different from the initially determined quadratic function) for which a minimum may be found as described above. If minimum variance is verified, method 700 proceeds to 712.

At 712, method 700 includes determining a restored image signal with the determined weighting constant value. As described with respect to method 300, the restored image signal (e.g., $s_1$ of equation (1)) is a difference between an overall image signal (e.g., I of equation (1)) and a weighted interference signal (e.g., product of weighting constant c and unweighted interference signal $s_2$ of equation (1)). The determined weighting constant may be used to determine the weighted interference signal as described with respect to FIG. 3 (e.g., by multiplying the weighting constant with the unweighted interference signal) and thus, similar to as described with reference to method 300, the determined weighting constant c may be used to determine the restored image signal from the overall image signal.

As noted, the method 700 may be executed in addition to the method 300 of FIG. 3, for example, the method 700 may be performed following 312 of method 300. In this way, the weighting constant that provides minimum variance may be determined via both the approximation of gradient descent as well as directly via a quadratic function. Determining the weighting constant in such a manner may ensure that minimum variance for the restored image signal is achieved. Further, implementing the quadratic function method as described here with respect to method 700 may decrease processing demands of the computing device as a number of iterations for the approximately of gradient descent needed to accurately determine a weighting constant that provides minimum variance may be reduced. Reducing number of iterations may also decrease time spent in determining the weighting constant.

A technical effect of the systems and methods provided herein is that image degradation due to channel-to-channel crosstalk in fluorescence microscopy may be mitigated by way of removing an interfering signal from an intended signal. Removal of interfering signals may allow for generation of more accurate images with reduced noise and interference. In this way, samples may be imaged by fluorescence microscopy in a more accurate way.

The disclosure also provides support for a method, comprising: accumulating a plurality of weighting constant values and variance data to determine a weighting constant of a weighted interference signal of a microscopy image, determining the weighted interference signal of the microscopy image based on the weighting constant, removing the weighted interference signal from an overall image signal of the microscopy image, and determining a recovered image signal based on removal of the weighted interference signal from the overall image signal. In a first example of the method, determining the weighting constant comprises fitting the plurality of weighting constant values and variance data to a quadratic curve and the weighting constant determined from the quadratic curve provides minimum variance of the recovered image signal. In a second example of the method, optionally including the first example, accumulating the plurality of weighting constant values and variance data comprises performing an approximation of gradient descent. In a third example of the method, optionally including one or both of the first and second examples, the method further comprises: saving the recovered image signal to memory and outputting an image corresponding to the recovered image signal to a display device. In a fourth example of the method, optionally including one or more or each of the first through third examples, the weighted interference signal is a product of an unweighted interference signal and the weighting constant. In a fifth example of the method, optionally including one or more or each of the first through fourth examples, determining the weighting constant further comprises finding a minimum of the quadratic curve. In a sixth example of the method, optionally including one or more or each of the first through fifth examples, the recovered image signal is a first channel signal and the unweighted interference signal is a second channel signal. In a seventh example of the method, optionally including one or more or each of the first through sixth examples, the overall image signal of the microscopy image comprises the weighted interference signal combined with the recovered image signal.

The disclosure also provides support for a microscopy system, comprising: an imager configured to acquire microscopy images of a sample, a computing device including a processor communicatively coupled to the imager, wherein the computing device is configured to execute instructions stored in non-transitory memory that, when executed, cause the processor to: obtain a microscopy image acquired by the imager, determine an overall image signal of the microscopy image, determine a weighted interference signal of the overall image signal, wherein determining the weighted interference signal comprises determining a weighting constant that provides minimum variance of an intended image signal by performing an approximation of gradient descent and fitting a resulting plurality of weighting constant values to a quadratic function, remove the weighted interference signal from the overall image signal to recover the intended image signal, and output the intended image signal for display on a display device. In a first example of the system, the imager is configured for fluorescence microscopy. In a second example of the system, optionally including the first example, the overall image signal is a sum of the weighted interference signal and the intended image signal. In a third example of the system, optionally including one or both of the first and second examples, the sample includes a fluorescent dye that emits a spectrum of wavelengths, wherein the spectrum of wavelengths is included in two or more channels. In a fourth example of the system, optionally including one or more or each of the first through third examples, the non-transitory memory includes further instructions that, when executed by the processor, cause the processor to determine an unweighted interference signal, wherein the weighted interference signal is a product of the unweighted interference signal and the weighting constant. In a fifth example of the system, optionally including one or more or each of the first through fourth examples, the intended image signal is of a first channel of the two or more channels and the unweighted interference signal is of a second channel of the two of more channels. In a sixth example of the system, optionally including one or more or each of the first through fifth examples, the weighting constant is a minimum of the quadratic function.

The disclosure also provides support for a method, comprising: obtaining a first image signal of a microscopy image acquired by a microscopy assembly, obtaining a second image signal of a first channel, and determining a third image signal of a second channel, wherein: the first image signal includes a first crosstalk interference of the first channel into the second channel, the first crosstalk interference being a first weighted interference of the second image signal, wherein the first weighted interference is a product of the second image signal and a scalar constant, wherein the scalar constant is determined based on accumulated scalar constants fitted to a quadratic curve and provides minimum variance of the third image signal. In a first example of the method, determining the third image signal includes determining the first weighted interference of the second image signal based on the scalar constant and removing the first weighted interference from the first image signal. In a second example of the method, optionally including the first example, the method further comprises: determining a fourth image signal of a third channel, wherein a fifth image signal includes a second crosstalk interference of the second channel into the third channel. In a third example of the method, optionally including one or both of the first and second examples, determining the fourth image signal of the third channel includes removing a second weighted interference of the third image signal from the fifth image signal. In a fourth example of the method, optionally including one or more or each of the first through third examples, the scalar constant is a minimum of the quadratic As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
accumulating a plurality of weighting constant values and variance data to determine a weighting constant of a weighted interference signal of a microscopy image;
determining the weighted interference signal of the microscopy image based on the weighting constant;
removing the weighted interference signal from an overall image signal of the microscopy image; and
determining a recovered image signal based on removal of the weighted interference signal from the overall image signal.

2. The method of claim 1, wherein determining the weighting constant comprises fitting the plurality of weighting constant values and variance data to a quadratic curve and the weighting constant determined from the quadratic curve provides minimum variance of the recovered image signal.

3. The method of claim 1, wherein accumulating the plurality of weighting constant values and variance data comprises performing an approximation of gradient descent.

4. The method of claim 1, further comprising saving the recovered image signal to memory and outputting an image corresponding to the recovered image signal to a display device.

5. The method of claim 1, wherein the weighted interference signal is a product of an unweighted interference signal and the weighting constant.

6. The method of claim 1, wherein determining the weighting constant further comprises finding a minimum of the quadratic curve.

7. The method of claim 5, wherein the recovered image signal is a first channel signal and the unweighted interference signal is a second channel signal.

8. The method of claim 1, wherein the overall image signal of the microscopy image comprises the weighted interference signal combined with the recovered image signal.

9. A microscopy system, comprising:
an imager configured to acquire microscopy images of a sample,
a computing device including a processor communicatively coupled to the imager, wherein the computing device is configured to execute instructions stored in non-transitory memory that, when executed, cause the processor to:
obtain a microscopy image acquired by the imager;
determine an overall image signal of the microscopy image;
determine a weighted interference signal of the overall image signal, wherein determining the weighted interference signal comprises determining a weighting constant that provides minimum variance of an intended image signal by performing an approximation of gradient descent and fitting a resulting plurality of weighting constant values to a quadratic function;
remove the weighted interference signal from the overall image signal to recover the intended image signal; and
output the intended image signal for display on a display device.

10. The microscopy system of claim 9, wherein the imager is configured for fluorescence microscopy.

11. The microscopy system of claim 9, wherein the overall image signal is a sum of the weighted interference signal and the intended image signal.

12. The microscopy system of claim 9, wherein the sample includes a fluorescent dye that emits a spectrum of wavelengths, wherein the spectrum of wavelengths is included in two or more channels.

13. The microscopy system of claim 12, wherein the non-transitory memory includes further instructions that, when executed by the processor, cause the processor to determine an unweighted interference signal, wherein the weighted interference signal is a product of the unweighted interference signal and the weighting constant.

14. The microscopy system of claim 13, wherein the intended image signal is of a first channel of the two or more channels and the unweighted interference signal is of a second channel of the two of more channels.

15. The microscopy system of claim 9, wherein the weighting constant is a minimum of the quadratic function.

16. A method, comprising:
obtaining a first image signal of a microscopy image acquired by a microscopy assembly;
obtaining a second image signal of a first channel; and
determining a third image signal of a second channel, wherein:
the first image signal includes a first crosstalk interference of the first channel into the second channel, the first crosstalk interference being a first weighted interference of the second image signal, wherein the first weighted interference is a product of the second image signal and a scalar constant, wherein the scalar constant is determined based on accumulated scalar constants fitted to a quadratic curve and provides minimum variance of the third image signal.

17. The method of claim 16, wherein determining the third image signal includes determining the first weighted interference of the second image signal based on the scalar constant and removing the first weighted interference from the first image signal.

18. The method of claim 16, further comprising determining a fourth image signal of a third channel, wherein a fifth image signal includes a second crosstalk interference of the second channel into the third channel.

19. The method of claim 18, wherein determining the fourth image signal of the third channel includes removing a second weighted interference of the third image signal from the fifth image signal.

20. The method of claim 16, wherein the scalar constant is a minimum of the quadratic curve.

* * * * *